United States Patent [19]
Alther

[11] Patent Number: 6,080,319
[45] Date of Patent: Jun. 27, 2000

[54] CHEMICAL METHODS FOR REMOVING CONTAMINANTS FROM WATER

[75] Inventor: George Alther, Ferndale, Mich.

[73] Assignee: Biomin Inc., Huntington Woods, Mich.

[21] Appl. No.: 09/099,759

[22] Filed: Jun. 18, 1998

[51] Int. Cl.⁷ .................................................. C02F 1/28
[52] U.S. Cl. ...................... 210/679; 210/683; 210/684; 210/691
[58] Field of Search .................... 210/679, 681, 210/683, 684, 688, 691, 502.1; 502/401

[56] References Cited

U.S. PATENT DOCUMENTS

| | | | |
|---|---|---|---|
| 4,080,171 | 3/1978 | Sano et al. ........................... | 210/679 |
| 4,386,010 | 5/1983 | Hildebrandt ......................... | 210/502.1 |
| 4,549,966 | 10/1985 | Beall .................................. | 210/691 |
| 4,773,939 | 9/1988 | Meffert et al. ...................... | 210/679 |
| 4,790,940 | 12/1988 | Castaldi et al. ..................... | 210/903 |
| 5,401,417 | 3/1995 | Dentel et al. ....................... | 210/691 |
| 5,634,969 | 6/1997 | Cody et al. ......................... | 501/148 |
| 5,667,694 | 9/1997 | Cody et al. ......................... | 210/679 |
| 5,717,000 | 2/1998 | Karande et al. .................... | 521/83 |

*Primary Examiner*—Ivars Cintins
*Attorney, Agent, or Firm*—Young & Basile, P.C.

[57] ABSTRACT

A method is provided for removing contaminants from water. The method comprises contacting the contaminants in the water with an organoclay having a positive or negative charge on its surface. Using this method, organic and inorganic contaminants can be removed with such charged organoclays.

14 Claims, No Drawings

CHEMICAL METHODS FOR REMOVING CONTAMINANTS FROM WATER

BACKGROUND OF THE INVENTION

The present invention is directed to a chemically modified clay that was rendered organophilic, and has a charged surface, and to methods for its use. This charged organophilic clay is useful in the removal of charged contaminants, both positive and negative, both organic and inorganic, from water. This method is particularly useful in the treatment of wastewater, surface water and ground water.

Removal of cationic heavy metals from water is well established in industry. Media that have been in use for years are bentonite (smectite), zeolite, and cation exchange resins. These media remove heavy metals such as Pb, Zn, Ni, Co, Cd, etc., by ion exchange, meaning the major cation present at the surface of the media, usually Na, Ca, Mg, is replaced by heavy metal cation present in the water because those ions are easily released by the clay. The exchanged ion becomes part of the contaminant load of the water.

None of these methods, however, are able to remove negatively charged organic compounds such as humic and fulvic acids. While these compounds, by definition, are acids, they do have negative charges spread throughout their structure.

None of these methods are capable of removing inorganic, negatively charged compounds such as the chromate, selenite and arsenate anions from water. Furthermore, none of these methods are able to remove positively charged organic compounds such as chelating agents, amines and cationic surfactants from water.

Organoclays have been used in the past for removal of non-polar oily substances by partitioning. The following relevant U.S. patents apply: U.S. Pat. No. 2,367,384 to Tymstra; U.S. Pat. No. 2,937,142 to Rios; U.S. Pat. No. 4,473,477 to Beall; U.S. Pat No. 4,517,094 to Beall.

None of these aforementioned methods suggests the use of charged organoclays for removal of positively or negatively charged contaminants. None of these methods suggest the use of charged organoclays for the removal of inorganic anionic metals such as arsenate, selenite and chromate. Organoclays mentioned in the Beall patents are non-ionic. In fact, patent U.S. Pat. No. 4,517,094 discloses that lower molecular weight/higher solubility compounds pass through columns filled with non-ionic organoclays.

On the other hand, activated carbon has long been used to remove such compounds as humic and fulvic acids and chelates such as EDTA. However, the humic acids are very large and foul activated carbon quickly. Non-ionic organoclays are also of much lower capacity. The kinetics of activated carbon for chelates are so slow that activated carbon is not effective for such compounds.

SUMMARY OF THE INVENTION

Now in accordance with the present invention a material is provided for removing charged organic and inorganic compounds from water. This material is an organoclay with a charge on its surface, positive or negative. These charges are then brought in contact with the charges on the organic or inorganic contaminant.

A method for removing an ionic contaminant from an aqueous composition according to the present invention comprises the steps of:

modifying a mineral with at least one of: a stoichiometric excess of an organic ionic compound; and an ampho-teric surfactant, thereby providing an organically modified mineral having an ionically charged surface; then contacting the aqueous composition with the organically modified mineral; and separating the aqueous composition from the organically modified mineral, whereby the ionic contaminant is retained by the charged surface.

According to the present invention, the mineral may be selected from the group consisting of clays and zeolites.

DETAILED DESCRIPTION OF THE PREFERRED EMBODIMENTS

Organoclays are well known in the art as exemplified by patents to Hauser, U.S. Pat. No. 2,531,427, and Jordan, U.S. Pat. No. 2,966,506, the disclosures of which are incorporated herein by reference. In this invention the term "organoclay" refers to various clay types, e.g. smectites, that have organic ammonium ions and/or other organic compounds substituted for cations between the clay layers. The term "substituted organo ammonium ion" refers to a substituted ammonium ion in which one or more hydrogen atoms are replaced by an organic group. The organoclays are essentially solid compounds that have an inorganic and an organic phase.

The preferred clay substrates for use in this invention are the smectite type clays. These clays include any type clay such as montmorillonite, paligorskite, attapulgite, sepiolite, saponite, kaolinite, halloysite, hectorite, beidellite and others. Other minerals include zeolites such as chabazite, clinoptilolite, and others. Within the context of this disclosure, organically modified clays and zeolites will be referred to as "organominerals" or "organically modified minerals".

Generally, the cationic quaternary ammonium salt substituted onto the clay has organic groups attached to the clay which will range from aliphatic hydrocarbons of from 1 to 24 carbon atoms and more, to aromatic molecules, such as benzyl groups that could have a host of groups substituted on the benzyl ring. Any organoclay or organozeolite is useful in this application.

Cationic quaternary ammonium ions (surfactants) are usually ion exchanged onto the clay or zeolite based on the ion exchange capacity of the substrate. In other words, a balance exists between the mili-equivalent ion exchange capacity of the clay versus the number of quaternary ammonium ions that are ion exchanged onto the clay. This balance is 1:1.

The following discovery has been made. If, for example, more cationic quaternary ammonium ions are added to the clay during the manufacturing process than the clay has ionic capacity for, a process which is conducted in the presence of water, some quaternary amines stick between the chains of the ion exchanged ones in an inverted position, and the positive charge sticks out into the water. This means that the uncharged portion sticks between the chains of the quartenary amine that is fixed onto the clay surface, where it is held by tail—tail interaction due to coulombic forces. As a result, the organoclay has now a positively charged surface, and the charges attract compounds of the opposite charge. These charges can be multiplied by mixing in other cationic surfactants such as sodium lauryl sulfate, toluene sulfonamide, and others, which are also cations.

It is to be understood that any suitable cationic organic modifying compounds may be used, provided that such compounds function in the manner as specified hereinabove to provide a positive charge on the mineral surface.

However, in the preferred embodiment, this organic modifying compound is selected from the group consisting of quaternary ammonium compounds, fatty alkyl containing quaternary ammonium compounds, quaternary phosphonium compounds, pyridinium compounds, sodium lauryl sulfate, toluene sulfonamide, and mixtures thereof. In the more preferred embodiment, quaternary ammonium compounds are used.

To achieve a negative charge, the clay or zeolite is modified by means of an amphoteric surfactant, one which has both a positive and a negative charge. The positive charge will ion exchange onto the clay, while the negative charge will extend into the water. Such surfactants are well known in the detergent/surfactant industry. Examples are: coco amido propyl dimethyl betaine and coco amido propyl dimethyl sultaine, from Lonza.

EXAMPLE 1

Removal of Negatively Charged Inorganic Compounds from Water

Batch tests were conducted by spiking water with negatively charged metals, and removing them with cationic organoclay. Two grams of organoclay are placed into 100 ml of spiked water. The mixture is stirred for 20 minutes and filtered. A known blank is first analyzed by atomic absorption or other spectrophotometric methods to obtain accurate readings. Analysis after filtration was run using the same method.

|  |  | Cr VI Remaining |
| --- | --- | --- |
| Chromate |  |  |
| 2 grams Anion Exchange Resin | 10 ppm CrVI | 0.04 mg/l |
| 2 grams Organoclay 1 | 30 ppm CrVI | 3.70 mg/l |
| 2 grams Organoclay 2 | 10 ppm CrVI | 0.38 mg/l |
| Arsenate |  |  |
| 2 grams Organoclay 1 | 5 ppm As | 2.1 mg/l |
| 2 grams Organoclay 2 | 20 ppm As | 5.6 mg/l |
| Selenite |  |  |
| 2 grams Organoclay 1 | 20 ppm Se | 3.7 mg/l |
| 2 grams Organoclay 2 | 10 ppm Se | 5.2 mg/l |
| Cyanide |  |  |
| 2 grams Organoclay | 12 ppm CN | 4.4 mg/l |

EXAMPLE 2

Removal of Negatively Charged Organic Compounds from Water

Batch tests were conducted with cationic organophilic clays by spiking 100 ml. of water with negatively charged organic compounds. The water was spiked with 1950 mg/l of fulvic acid from the Suwannee River, which is a IH SS Standard (International Humic Substance Society), shaking it for 48 hours before filtering and analysing.

The results are:

| 1 gram cationic Organoclay | 510 mg/l fulvic acid remaining |
| --- | --- |

Total Organic Carbon Removed: 73.8%

| 1 gram Synthetic Resin (Organic Trap); [strong basic anion exchange resin, chlorinated] | 1720 mg/l remaining |
| --- | --- |

Total Organic Carbon Removed: 11.8%

EXAMPLE 3

Removal of Positively Charged Organic Compounds from Water

Batch tests were conducted by spiking 1000 ml of water with 550 ppm of sodium ethylene diamine tetraacetic acid (EDTA) and adding 1 gram of negatively charged organically modified clay, shaking it for 48 hours before extraction and testing.

The results are:

Organoclay: 165 mg/l EDTA remaining, 70% removal.

Coal Based Activiated Carbon: 390 mg/l EDTA remaining, 29.1% removal.

While the foregoing examples employed clay based materials, similar results will be achieved utilizing off-stochiometric, organically modified zeolites. The foregoing examples are meant to illustrate some embodiments of the invention, but are not meant to be limitations thereupon. It is the following claims, including all equivalents, which define the scope of the invention.

What is claimed is:

1. A method for removing an ionic contaminant from an aqueous composition, said method consisting of the steps of:
   modifying a mineral with at least one of: a stoichiometric excess of an organic ionic compound; and an amphoteric surfactant, thereby providing an organically modified mineral having an ionically charged surface; then
   contacting said aqueous composition with said organically modified mineral having an ionically charged surface; and
   separating said aqueous composition from said organically modified mineral, whereby said ionic contaminant is retained by said charged surface.

2. A method as in claim 1, wherein said organically modified mineral is disposed in a column, and wherein the step of contacting said aqueous composition with said organically modified mineral comprises flowing said aqueous composition through said column.

3. A method as in claim 1, wherein the step of contacting said aqueous composition with said organically modified mineral comprises introducing said organically modified mineral into said aqueous composition.

4. A method as in claim 1, wherein the step of providing an organically modified mineral comprises providing an organically modified clay.

5. A method as in claim 4, wherein said organically modified clay is an organically modified smectite clay.

6. A method as in claim 4, wherein said organically modified clay is an organically modified clay selected from the group consisting of nontronite, beidellite, stevensite, hectorite, attapulgite, sepiolite, paligorskite, vermiculite, halloysite, kaolinite, and combinations thereof.

7. A method as in claim 1, wherein the step of providing an organically modified mineral comprises providing an organically modified zeolite.

8. A method as in claim 1, wherein the step of providing an organically modified mineral comprises providing a mineral which is modified with a stoichiometric excess of a quaternary ammonium compound.

9. A method as in claim 1, wherein the step of providing an organically modified mineral comprises providing a smectite clay modified with a stoichiometric excess of a fatty alkyl containing quaternary ammonium compound.

10. A method as in claim 1, wherein the step of providing an organically modified mineral comprises providing a clay modified with a stoichiometric excess of a quaternary phosphonium compound.

11. A method as in claim 1, wherein the step of providing an organically modified mineral comprises providing a clay modified with a stoichiometric excess of a pyridinium compound.

12. A method as in claim 1, wherein said organically modified mineral has a positively charged surface and said ionic contaminant in said aqueous composition is a negatively charged inorganic compound selected from the group consisting of chromate, selenate, arsenate, and cyanide.

13. A method for removing an ionic contaminant from an aqueous composition, said method comprising the steps of:

modifying a mineral with at least one of: a stoichiometric excess of an organic ionic compound; and an amphoteric surfactant, thereby providing an organically modified mineral having an ionically charged surface; then contacting said aqueous composition with said organically modified mineral; and separating said aqueous composition from said organically modified mineral, whereby said ionic contaminant is retained by said charged surface;

wherein said organically modified mineral has a negatively charged surface and wherein said ionic contaminant comprises a positively charged organic compound.

14. A method as in claim 1, wherein said organically modified mineral has a positively charged surface and wherein said ionic contaminant comprises a negatively charged organic compound.

* * * * *